Figure 1:
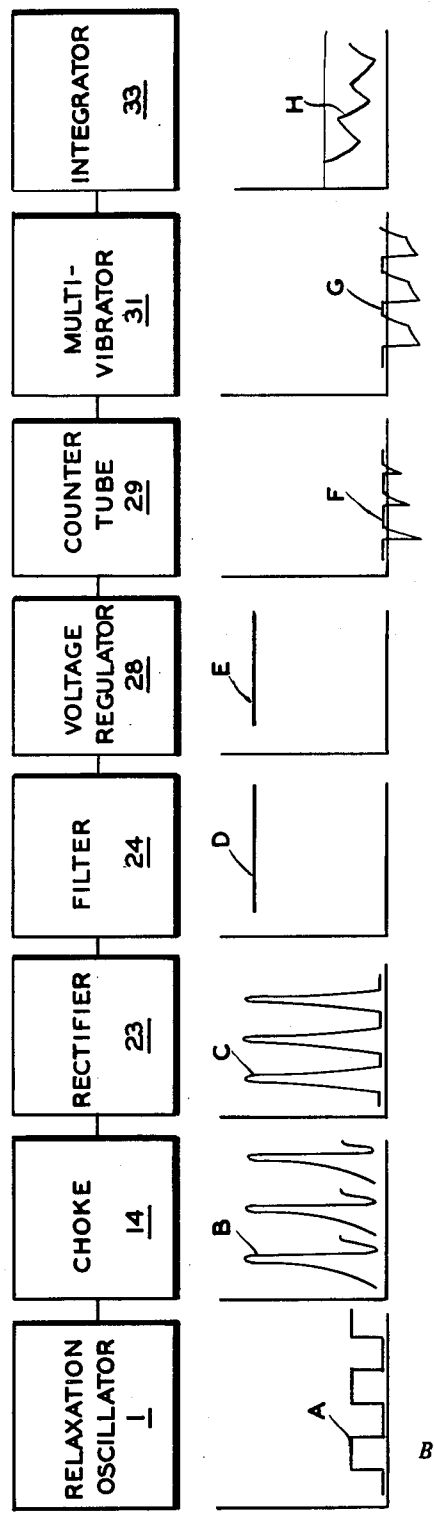

June 26, 1956 G. V. ZITO 2,752,508
COUNTING-RATE METER
Filed Nov. 22, 1950 2 Sheets-Sheet 1

INVENTOR.
GEORGE V. ZITO

June 26, 1956

G. V. ZITO 2,752,508

COUNTING-RATE METER

Filed Nov. 22, 1950

2 Sheets-Sheet 2

INVENTOR.
GEORGE V. ZITO
BY
*S. H. Hartz*
ATTORNEY

United States Patent Office 2,752,508
Patented June 26, 1956

2,752,508

COUNTING-RATE METER

George V. Zito, Jersey City, N. J., assignor, by mesne assignments, to the United States of America as represented by the United States Atomic Energy Commission Application November 22, 1950, Serial No. 197,000

6 Claims. (Cl. 250—83.6)

The invention relates to counting electric pulses and more particularly to indicating the average rate of occurrence of such pulses. The invention is adapted particularly to counting electrical pulses from a Geiger-Mueller tube in response to radiations from a radio-active source.

One object of the present invention is to produce voltage pulses of uniform width and amplitude in response to random pulses from a Geiger-Mueller tube.

Another object is to integrate the voltage pulses and indicate by suitable means the average rate of occurrence of the pulses.

Another object is to receive random pulses of varying widths and produce voltage pulses of uniform width at a rate corresponding to the occurrence of the random pulses.

A further object is to use a multivibrator for producing uniform pulses and to connect an integrating circuit directly to the output of the multivibrator without using a separate amplifier stage.

Another object is to use a choke coil as the load resistor in the output of a relaxation oscillator to produce a high voltage without using an amplifier.

Another object is to provide a pulse counter-circuit which includes means for varying its sensitivity so that a single meter may be used to average random pulses whose rate of occurrance varies over a wide range.

Another object is to provide a light, compact, portable device for indicating the average rate of radiation from a radio-active source.

The invention contemplates a meter for measuring the average frequency of random pulses. A counter circuit including a multi-vibrator receives the pulses and provides pulses of uniform width at a rate determined by the rate at which the pulses are applied to the counter circuit. The counter circuit includes means connected directly to the output of the multi-vibrator for integrating the pulses and for indicating the average rate of occurrence of the pulses. The counter circuit also includes means for changing the sensitivity of the circuit so that the device will accurately indicate the rate at which the radiations occur, even when they occur at greatly varying rates.

The foregoing and other objects and advantages of the invention will appear more fully hereinafter from a consideration of the detailed description which follows, taken together with the accompanying drawings, wherein one embodiment of the invention is illustrated. It is to be expressly understood, however, that the drawings are for the purposes of illustration and description only, and are not to be construed as defining the limits of the invention.

Figure 2:
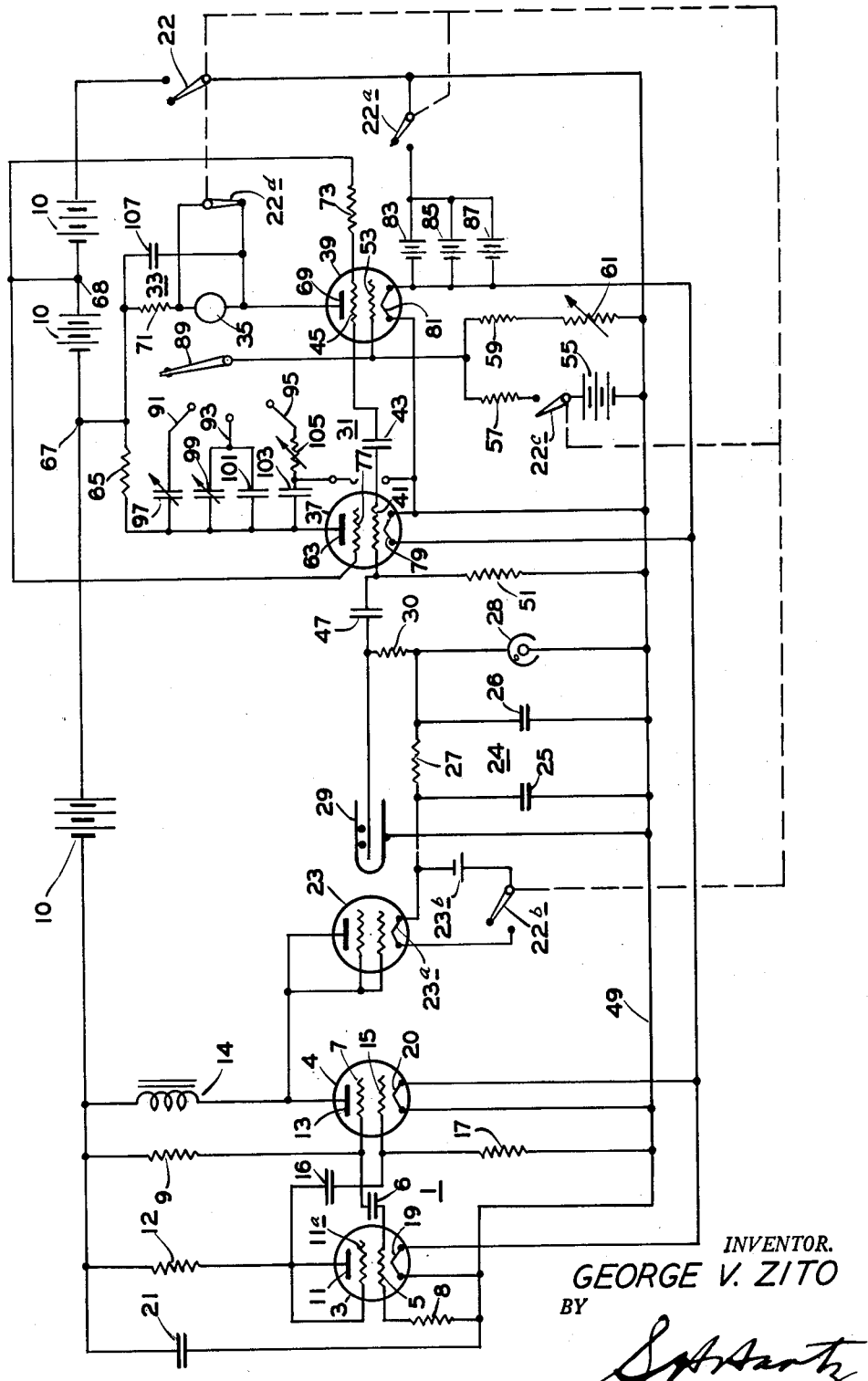

In the drawings, Figure 1 is a block diagram of a device constructed according to the invention, and shows the various wave configurations produced by the several elements of the device; and Figure 2 is a detailed schematic diagram of the device.

Referring now to the drawings for a more detailed description of the counting-rate meter of the present invention, the meter is shown in the drawings as including a relaxation oscillator 1 adapted to produce a pulsating voltage A of square wave form, as shown in Figure 1. The oscillator comprises a pair of electron tubes 3, 4 with the control grid 5 of tube 3 connected through a condenser 6 to the screen grid 7 of tube 4, and to a ground lead 49 through a grid return resistor 8. Screen grid 7 is connected through a load resistor 9 to B+ supply 10 and functions as an anode independently of plate 13 of tube 4. The plate 11 of tube 3 is connected to screen grid 11a of tube 3 and through a load resistor 12 to the B+ supply 10, and plate 13 of tube 4 is connected to the B+ supply 10 through a load impedance comprising a high inductance choke 14. Control grid 15 of tube 4 is connected through a condenser 16 to plate 11 of tube 3 and through a grid return resistor 17 to ground lead 49. Cathode 19 of tube 3 and cathode 20 of tube 4 are connected in parallel to ground lead 49 and are energized by batteries 83, 85, 87. Ground lead 49 is connected to B+ supply through a by-pass condenser 21.

A switch 22 connectes the negative terminal of B+ supply 10 to ground and a switch 22a connects the negative side of filament batteries 83, 85, 87 to ground.

When switches 22, 22a are closed, plate current flows in either tube 3 or tube 4 as determined by the tube characteristics. Assuming tube 3 conducts before tube 4, the initial surge of plate current causes a voltage drop across load resistor 12 which is impressed as a negative voltage on control grid 15 of tube 4 through condenser 16 and grid return resistor 17. Control grid 15 of tube 4 becomes more negative, and the plate and screen grid grid currents of tube 4 decrease, and the potential of the screen grid increases as the current through resistor 9 decreases. This transfers a positive charge through coupling condenser 6 and grid return resistor 8 which appears as a positive potential on control grid 5 of tube 3 to further increase plate current of tube 3.

Tube 3 soon passes maximum current and tube 4 is biased to plate current cut-off. Under these conditions, condenser 16 retains a minimum charge and condenser 6 attains a maximum charge. Condenser 6 then discharges and decreases the potential of grid 5 of tube 3 and decreases plate current flow through tube 3. Simultaneously, condenser 16 charges and increases the potential of grid 15 of tube 4, and plate current flow through tube 4 increases until tube 4 is passing maximum plate current and tube 3 is biased to plate current cut-off.

The circuit will oscillate at a frequency determined by the values of the circuit components. The high inductance choke 14 passes current which rises almost instantaneously, assumes a fixed value for a finite time, and then falls off substantially instantaneously, whereupon the choke develops a large counter E. M. F., as shown at B in Figure 1, across its terminals because of its high inductance. The high E. M. F. is isolated from the relaxation oscillator because screen grid 7 of tube 4 is connected as an anode independently of plate 13 and the high E. M. F. does not appear in the multivibrator circuit.

The high E. M. F. of choke 14 is rectified by a rectifier 23 including a diode connected electron discharge tube, which may be a tetrode as shown, or a pentode (Figure 2). Filament 23a of the tube 23 is energized by battery 23b by closing switch 22b. The output of the rectifier, shown at C in Figure 1, is applied to a filter 24 including condensers 25 and 26 and resistor 27. The filtered voltage, shown at D in Figure 1, is applied to a voltage regulator 28 which may be a corona regulator tube (see Figure 2) connected across the output of filter 24 to maintain the voltage at a fixed potential, as shown at E in Figure 1, irrespective of variations in the voltage source and the load.

A Geiger-Mueller counter tube 29 is connected across the output of voltage regulator 28 in series with a load resistor 30. When the Geiger-Mueller tube is subjected to ionizing particles from a radio-active source, random voltage pulses, shown at F in Figure 1, and varying in amplitude and duration, appear across load resistor 30 (Figure 2).

The pulses are applied to a counter circuit including a multivibrator 31 producing pulses of characteristic uniform wave form, shown at G in Figure 1, at a rate corresponding to the occurrence of voltage pulses across resistor 30 which trigger the multivibrator. The pulses G from multivibrtor 31 are impressed on an integrating circuit 33, and are integrated as shown at H in Figure 1. The integrating circuit includes an indicator 35 preferably calibrated in units of biological dosage.

Multivibrator 31 includes a pair of electron tubes 37, 39 with the control grid 41 of tube 37 connected through a condenser 43 to the screen grid 45 of tube 39 and through a condenser 47 to resistor 30. Condenser 47 blocks the high voltage counter tube supply, but provides for control grid 41 of the tube 37 to sense the pulses delivered by the counter tube across resistor 30. Control grid 41 of the tube 37 is connected through a grid return resistor 51 to ground lead 49, and control grid 53 of tube 39 is connected to ground lead 49 through a biasing battery 55 and adjustable bleeder network comprising fixed resistors 57, 59 and adjustable resistor 61. Resistor 57 is connected in series with battery 55, and resistors 59, 61 are connected in series with one another and parallel to resistor 57 and battery 55, between ground line 49 and control grid 53. Resistor 61 normally is adjusted so that in the absence of pulse voltages across resistor 30, tube 39 is biased to cut-off. A switch 22c is connected in series with battery 55 and resistor 57 to de-energize the circuit when the device is not being used.

Plate 63 of tube 37 is connected through a load resistor 65 to B+ supply 10 at point 67, and plate 69 of tube 39 is connected through meter 35 and resistor 71 to B+ supply 10 at point 67. A condenser 107 is connected in parallel with resistor 71 and meter 35, providing an integrating circuit. A switch 22d short circuits meter 35 when the device is not being used. Screen grid 45 of tube 39 is connected through a load resistor 73 to B+ supply 10 at a point 68 and functions as an anode independently of plate 69. Screen grid 77 of tube 37 is connected directly to point 68. Cathodes 79, 81 of tubes 37, 39, respectively, are connected in parallel to ground lead 49, and are energized by batteries 83, 85, 87. Control grid 53 of tube 39 may be connected through an adjustable switch 89 through one of the paths 91, 93, 95 of different capacities, to plate 63 of tube 37. Path 91 includes a variable condenser 97, path 93 includes a variable condenser 99 and a fixed condenser 101 in parallel with one another, and path 95 includes a fixed condenser 103 and a variable resistor 105 in series with one another.

When a negative voltage pulse from counter tube 29 appears across resistor 30, a negative voltage pulse appears across grid return resistor 51 and drives tube 37 toward cut-off. With decreased current flow in the plate circuit, the plate voltage of tube 37 increases.

As explained above, tube 39 normally is biased to cut-off in the absence of pulse voltages from the counter tube, and meter 35 in the plate circuit normally reads zero. The positive pulse in the plate circuit of tube 37, due to the decrease in current flow through the tube, impresses a positive pulse across the bleeder network through one of the parallel paths 91, 93, 95, as determined by the position of switch 89, and the magnitude of the pulse is determined by the circuit constants of the path. The positive pulse across the bleeder network is impressed on grid 53 of tube 39, and reduces the negative grid bias so that current flows in the plate circuit of tube 39. The voltage pulse in the bleeder circuit persists for a time as determined by the capacity of the selected path 91, 93 or 95 and the resistance of resistors 59, 61. As the grid bias of tube 39 becomes less negative, current flows in the tube and through resistors 71, 73 and the voltage at the screen grid 45 of tube 39 decreases. A negative pulse is applied through coupling condenser 43 to the control grid 41 of tube 37, thereby driving tube 37 to cut-off.

Under these circumstances, the quiescent condition is reversed, that is, tube 37 is biased to cut-off and tube 39 conducts maximum plate current. This continues until the charge on the condenser in the selected path 91, 93 or 95 leaks off through grid resistors 59, 61, whereupon grid 53 is again biased to cut-off and the potential of grid 41 increases and tube 37 again conducts.

The resolving time of the multivibrator circuit primarily depends upon the time constant of the capacitance-resistance network in the grid circuit of tube 39 so that a pulse of fixed amplitude and duration is generated in the plate circuit of tube 39 by making the time constant of the network greater than the duration of the pulse from counter tube 29.

While tube 39 is conducting, current flows through meter 35 and load resistor 71 and charges condenser 107. When tube 39 becomes non-conducting, the charge leaks off condenser 107 through meter 35 and resistor 71. The circuit including condenser 107, meter 35 and resistor 71 integrates the pulses so that meter 35 indicates the average number of pulses produced by counter tube 29 as determined by the time constant of the integrating circuit. Since biological dosage is directly proportional to the rate of arrival of ionizing particles and since the counter tube generates a pulse upon arrival of each ionizing particle and the counting circuit indicates the average rate of arrival of the pulses, the meter may be calibrated directly in units of biological dosage as indicated above.

By connecting screen grid 45 of tube 39 as an anode independently of plate 69, the integrating circuit may be connected directly to the output of the multi-vibrator without using a separate stage of amplification. The circuit produces voltage pulses of uniform width at a rate corresponding to the occurrence of random pulses, and meter 35 indicates the average rate of occurrence of the pulses. The device is light, compact, and portable and may be used to indicate the average rate of radiation from a radioactive source.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a meter for measuring the frequency of electrical pulses, a multi-vibrator adapted to receive said pulses and including a pair of electron tubes each having a cathode, a plate and a control grid, at least one of said tubes having a screen grid functioning as an anode independently of said plate, and integrating means including an indicator connected in the plate circuit of said last-mentioned tube, whereby said indicator indicates the integrated output of said last-mentioned tube.

2. In a meter for measuring the average frequency of random pulses of relatively narrow width, a multi-vibrator having a time constant greater than the width of the pulses and including a pair of electron tubes each having a cathode, a plate, and a control grid and at least one of said tubes having a screen grid functioning as an anode independently of said plate, capacitance means connecting the screen grid of said one tube to the control grid of the other tube, and integrating means including an indicator connected to the plate of said one tube whereby said indicator indicates the integrated output of said one tube.

3. In a meter for measuring the average frequency of random pulses of relatively narrow width, a multi-vibrator including a pair of electron tubes each having a cathode, a plate and a grid, at least one of said tubes having a screen grid functioning as an anode independently of said plate indicating means connected in the plate circuit of said tube, a plurality of capacitance means in parallel with one another for selectively connecting the grid of said tube to the plate of the other tube and being of different values, and switching means for selectively connecting said capacitance means to the grid and plate of said tubes to vary the time constant of said multi-vibrator and change the response of said indicating means.

4. In a meter for measuring the average frequency of random pulses of relatively narrow width, a multi-vibrator having a time constant greater than the width of the pulses and including a pair of electron tubes each having a cathode, a plate, and a control grid, at least one of said tubes having a screen grid functioning as an anode independently of said plate, integrating means including an indicator connected to the anode of said one tube, capacitance means connecting the screen grid of said one tube to the control grid of the other tube, a plurality of capacitance means in parallel with one another for selectively connecting the control grid of said one tube to the plate of the other tube and said capacitance means being of different values, and switching means connecting said control grid and plate selectively through said capacitance means to vary the time constant of said multi-vibrator and change the response of said indicator.

5. In a device for determining average intensity of radio-active particle bombardment, a Geiger-Mueller tube adapted to provide random electrical pulses in response to radio-active particles bombarding said tube, a multi-vibrator adapted to receive said pulses and including a pair of electron tubes each having a cathode, a plate and a control grid, at least one of said tubes having a screen grid functioning as an anode independently of said plate, and integrating means including an indicator calibrated in units of biological dosage and connected in the plate circuit in said last-mentioned tube.

6. In a device for determining average intensity of radio-active particle bombardment, a Geiger-Mueller tube adapted to provide random electrical pulses in response to radio-active particles bombarding said tube, a multi-vibrator adapted to receive said pulses and including a pair of electron tubes each having a cathode, a plate and a grid, indicating means calibrated in units of biological dosage connected in the plate circuit of said one tube, capacitance means connecting the grid of said one tube to the anode of the other tube and being of a value so that the time constant of the multi-vibrator is greater than the widths of the pulses from the Geiger-Mueller tube, and means for varying the capacitance of said capacitance means to vary the time constant of the multi-vibrator and change response of said indicating means.

References Cited in the file of this patent

UNITED STATES PATENTS

| | | |
|---|---|---|
| 2,303,734 | Garceau | Dec. 1, 1942 |
| 2,383,478 | Friedman et al. | Aug. 28, 1945 |
| 2,405,572 | Friedman | Aug. 13, 1946 |
| 2,441,963 | Gray | May 25, 1948 |
| 2,490,642 | Lipson | Dec. 6, 1949 |
| 2,559,144 | Baracket | July 3, 1951 |
| 2,589,240 | Frye | Mar. 18, 1952 |
| 2,590,216 | Schuhfried | Mar. 25, 1952 |
| 2,614,222 | Skellett | Oct. 14, 1952 |
| 2,622,210 | Di Tella | Dec. 16, 1952 |

FOREIGN PATENTS

| | | |
|---|---|---|
| 946,638 | France | June 9, 1949 |

OTHER REFERENCES

Counting Rate Meter; Kip et al., Rev. of Sci. Inst., September 1946, vol. 17, #9, pp. 323–333.

Counting Rate Meter; Evans et al., Rev. of Sci. Inst., November 1939, vol. 10, pp. 332–335.